(12) United States Patent
Mansfield

(10) Patent No.: US 8,332,168 B2
(45) Date of Patent: Dec. 11, 2012

(54) INSTRUMENT POWER CONTROLLER AND METHOD FOR ADAPTIVELY PROVIDING AN OUTPUT VOLTAGE AND AN OUTPUT CURRENT THAT TOGETHER MAINTAIN A SUBSTANTIALLY CONSTANT ELECTRICAL OUTPUT POWER

(75) Inventor: William M Mansfield, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 423 days.

(21) Appl. No.: 12/664,528

(22) PCT Filed: Jun. 28, 2007

(86) PCT No.: PCT/US2007/072327
§ 371 (c)(1),
(2), (4) Date: Dec. 14, 2009

(87) PCT Pub. No.: WO2009/002341
PCT Pub. Date: Dec. 31, 2008

(65) Prior Publication Data
US 2010/0188064 A1 Jul. 29, 2010

(51) Int. Cl.
*G06F 19/00* (2011.01)
*G05F 5/00* (2006.01)
*H02M 5/42* (2006.01)
(52) U.S. Cl. .............. 702/57; 323/299; 363/89
(58) Field of Classification Search ........... 702/57, 702/58, 60; 363/78, 89, 95, 21.13; 323/282, 323/284, 299
See application file for complete search history.

(56) References Cited

U.S. PATENT DOCUMENTS

| | | | |
|---|---|---|---|
| 5,508,603 A | 4/1996 | Strong, III | |
| 5,790,392 A | 8/1998 | Eklund et al. | |
| 5,969,962 A * | 10/1999 | Gabor | 363/89 |
| 6,226,195 B1 | 5/2001 | Mansfield | |
| 6,751,107 B2 | 6/2004 | Matsuda et al. | |
| 7,548,438 B1 * | 6/2009 | Collmeyer et al. | 363/21.13 |
| 8,004,262 B2 * | 8/2011 | Saint-Pierre | 323/284 |
| 2003/0185026 A1 | 10/2003 | Matsuda et al. | |
| 2005/0151518 A1 | 7/2005 | Schneiker et al. | |
| 2007/0084280 A1 | 4/2007 | Gill et al. | |

FOREIGN PATENT DOCUMENTS
DE 3812861 A1 10/1989
(Continued)

*Primary Examiner* — Bryan Bui
(74) *Attorney, Agent, or Firm* — The Ollila Law Group LLC

(57) ABSTRACT

An instrument power controller (120) for adaptively providing an output voltage $V_O$ and an output current $I_O$ that together maintain a substantially constant electrical output power $P_O$ is provided. The controller (120) includes inputs (121) for receiving an input power $P_I$, outputs (122) for providing the substantially constant output power $P_O$ to a variable impedance load L, and a communication path (126) for receiving a load voltage $V_L$. The instrument power controller (120) is configured to determine an input voltage $V_I$ and an input current $I_I$, determine an effective resistance $R_L$ of the load L and set the output voltage $V_O$ and the output current $I_O$ based on the input voltage $V_I$, the input current $I_I$, and the effective resistance $R_L$. The output voltage $V_O$ is substantially independent from the input voltage $V_I$. The output voltage $V_O$ and the output current $I_O$ are varied to maximize a load power $P_L$ while maintaining the substantially constant electrical output power $P_O$.

31 Claims, 7 Drawing Sheets

FOREIGN PATENT DOCUMENTS

| | | |
|---|---|---|
| JP | 11266189 A | 9/1999 |
| JP | 2003172648 A | 6/2003 |
| JP | 2004304901 A | 10/2004 |
| RU | 2199838 C2 | 2/2003 |
| RU | 2313817 C2 | 10/2007 |
| SU | 531144 A1 | 6/1981 |
| WO | WO-01/76037 A1 | 10/2001 |
| WO | WO-01/76049 A2 | 10/2001 |
| WO | WO-01/92832 A2 | 12/2001 |

* cited by examiner

INSTRUMENT POWER CONTROLLER AND METHOD FOR ADAPTIVELY PROVIDING AN OUTPUT VOLTAGE AND AN OUTPUT CURRENT THAT TOGETHER MAINTAIN A SUBSTANTIALLY CONSTANT ELECTRICAL OUTPUT POWER

BACKGROUND OF THE INVENTION

1. Field of the Invention

The present invention relates to an instrument power controller and method, and more particularly, to an instrument power controller and method for adaptively providing an output voltage $V_O$ and an output current $I_O$ that together maintain a substantially constant electrical output power $P_O$.

2. Statement of the Problem

Flow meters are used to measure the mass flow rate, density, and other characteristics of flowing materials. The flowing materials can comprise liquids, gases, combined liquids and gases, solids suspended in liquids, liquids including gases and suspended solids, etc. A flow meter can be used to measure a flow rate (i.e., by measuring a mass flow through the flow meter), and can further be used to determine the relative proportions of components in a flow stream.

In many process control or industrial automation settings, a bus loop or instrumentation bus is used to connect to various types of devices, such as flow meters, for example. The bus loop is commonly used to deliver electrical power to the various attached instruments or devices. In addition, the bus loop is also commonly used to communicate data both to and from the sensor or device. Therefore, the bus loop is connected to a master device that can provide regulated electrical voltage over the bus and that can exchange communications over the bus. The master device can send commands and/or programming, data, calibrations and other settings, etc., to the various connected devices. The master device can also receive data from the connected devices, including identification data, calibration data, measurement data, operational data, etc.

The master device can further comprise a power supply that is connected to an electrical power source. The master device typically provides electrical power over the bus loop that is current limited, voltage limited, and power limited.

During normal operation of a vibratory flow meter, such as a densimeter or Coriolis flow meter, the current consumption and voltage requirements are relatively stable. However, when the flow meter is initially powered up, vibration of the meter flow tubes gradually increases in frequency and amplitude. Due to the construction and material of the flow tubes and due to the added mass of flow material in the flow tubes, the flow tubes cannot be immediately brought up to a target vibrational amplitude. Consequently, the startup phase will require electrical current above that required for normal operation. Therefore, the electrical current draw at startup is higher than a current draw during normal operation.

A bus loop can comprise a 4-20 milliamp (mA) bus loop, for example. The 4-20 mA bus is a two-wire instrumentation bus standard that is typically used to connect to a single instrument and is further capable of being used to provide communications between an instrument and a host device. Alternatively, the bus loop can comprise other bus protocols or standards.

According to requirements of Intrinsic Safety protection methods, the electrical power delivered by the master device/power supply is strictly limited for purposes of safety. For example, a 4-20 mA bus protocol can be limited to 20 mA of electrical current and can further be limited to 16-32 volts (V). The electrical power available to a device on the bus is therefore limited.

In some operating environments, flow tube startup can be problematic. One result of power limitation at startup time is that flow tube startup time is greatly extended, as excess current is not available for boosting the vibrational amplitude of the flow tube or tubes.

SUMMARY OF THE SOLUTION

An instrument power controller for adaptively providing an output voltage $V_O$ and an output current $I_O$ that together maintain a substantially constant electrical output power $P_O$ is provided according to an embodiment of the invention. The instrument power controller comprises inputs for receiving an input power $P_I$, outputs for providing the substantially constant output power $P_O$ to a variable impedance load L, and a communication path for receiving a load voltage $V_L$ from the load L. The instrument power controller is configured to determine an input voltage $V_I$ and an input current $I_I$, determine an effective resistance $R_L$ of the load L and set the output voltage $V_O$ and the output current $I_O$ based on the input voltage $V_I$, the input current $I_I$, and the effective resistance $R_L$. The output voltage $V_O$ is substantially independent from the input voltage $V_I$. The output voltage $V_O$ and the output current $I_O$ are varied so as to maximize a load power $P_L$ being transferred to the variable impedance load L while maintaining the substantially constant electrical output power $P_O$.

An electrical power control method for adaptively providing an output voltage $V_O$ and an output current $I_O$ that together maintain a substantially constant electrical output power $P_O$ is provided according to the invention. The method comprises determining an input voltage $V_I$ and an input current $I_I$ and determining an effective resistance $R_L$ of a variable impedance load L. The method further comprises setting the output voltage $V_O$ and the output current $I_O$ based on the input voltage $V_I$, the input current $I_I$, and the effective resistance $R_L$. The output voltage $V_O$ is substantially independent from the input voltage $V_I$. The output voltage $V_O$ and the output current $I_O$ are varied so as to maximize a load power $P_L$ being transferred to the variable impedance load L while maintaining the substantially constant electrical output power $P_O$.

An electrical power control method for adaptively providing an output voltage $V_O$ and an output current $I_O$ that together maintain a substantially constant electrical output power $P_O$ is provided according to the invention. The method comprises determining an input voltage $V_I$ and an input current $I_I$ and determining an effective resistance $R_L$ of a variable impedance load L. The method further comprises determining whether the effective resistance $R_L$ is within a predetermined normal operating range. The method further comprises setting the output voltage $V_O$ and the output current $I_O$ based on the input voltage $V_I$, the input current $I_I$, and the effective resistance $R_L$ if the effective resistance $R_L$ is not within the predetermined normal operating range. The output voltage $V_O$ is substantially independent from the input voltage $V_I$. The output voltage $V_O$ and the output current $I_O$ are varied so as to maximize a load power $P_L$ being transferred to the variable impedance load L while maintaining the substantially constant electrical output power $P_O$.

ASPECTS OF THE INVENTION

In one aspect of the instrument power controller, the input voltage $V_I$ comprises a substantially fixed input voltage $V_I$.

In another aspect of the instrument power controller, the effective resistance $R_L$ comprises $R_L=C_1V_L$.

In yet another aspect of the instrument power controller, the output voltage $V_O$ comprises $V_O=C_2\sqrt{V_I I_I R_L}$.

In yet another aspect of the instrument power controller, the input voltage $V_I$ and the input current $I_I$ comply with a bus loop standard.

In yet another aspect of the instrument power controller, the input voltage $V_I$ and the input current $I_I$ comply with an intrinsically safe (IS) standard.

In yet another aspect of the instrument power controller, the load L comprises a vibratory flow meter and the load voltage $V_L$ is related to a vibrational amplitude of one or more flow conduits of the vibratory flow meter.

In yet another aspect of the instrument power controller, the load L comprises a Coriolis flow meter and the load voltage $V_L$ is related to a vibrational amplitude of one or more flow conduits of the Coriolis flow meter.

In yet another aspect of the instrument power controller, the load L comprises a vibratory densitometer and the load voltage $V_L$ is related to a vibrational amplitude of one or more flow conduits of the vibratory densitometer.

In yet another aspect of the instrument power controller, the instrument power controller is further configured to determine whether the effective resistance $R_L$ is within a predetermined normal operating range and set the output voltage $V_O$ and the output current $I_O$ based on the input voltage $V_I$, the input current $I_I$, and the effective resistance $R_L$ if the effective resistance $R_L$ is not within the predetermined normal operating range.

In yet another aspect of the instrument power controller, the instrument power controller further comprises a voltage supply configured to set the output voltage $V_O$ and a current supply configured to set the output current $I_O$.

In yet another aspect of the instrument power controller, the instrument power controller further comprises a drive voltage converter configured to set the output voltage $V_O$, a drive current source configured to provide the output current $I_O$, and a control coupled to the drive voltage converter, to the load L, and to the loop current control, with the control configured to control the drive voltage converter and the drive current source to generate the substantially constant output power $P_O$ while setting both the output voltage $V_O$ and the output current $I_O$.

In one aspect of the method, the input voltage $V_I$ comprises a substantially fixed input voltage $V_I$.

In another aspect of the method, the effective resistance $R_L$ comprises $R_L=C_1V_L$.

In yet another aspect of the method, the output voltage $V_O$ comprises $V_O=C_2\sqrt{V_I I_I R_L}$.

In yet another aspect of the method, the input voltage $V_I$ and the input current $I_I$ comply with a bus loop standard.

In yet another aspect of the method, the input voltage $V_I$ and the input current $I_I$ comply with an intrinsically safe (IS) standard.

In yet another aspect of the method, the load L comprises a vibratory flow meter and the load voltage $V_L$ is related to a vibrational amplitude of one or more flow conduits of the vibratory flow meter.

In yet another aspect of the method, the load L comprises a Coriolis flow meter and the load voltage $V_L$ is related to a vibrational amplitude of one or more flow conduits of the Coriolis flow meter.

In yet another aspect of the method, the load L comprises a vibratory densitometer and the load voltage $V_L$ is related to a vibrational amplitude of one or more flow conduits of the vibratory densitometer.

In yet another aspect of the method, the method further comprises determining whether the effective resistance $R_L$ is within a predetermined normal operating range and setting the output voltage $V_O$ and the output current $I_O$ based on the input voltage $V_I$, the input current $I_I$, and the effective resistance $R_L$ if the effective resistance $R_L$ is not within the predetermined normal operating range.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
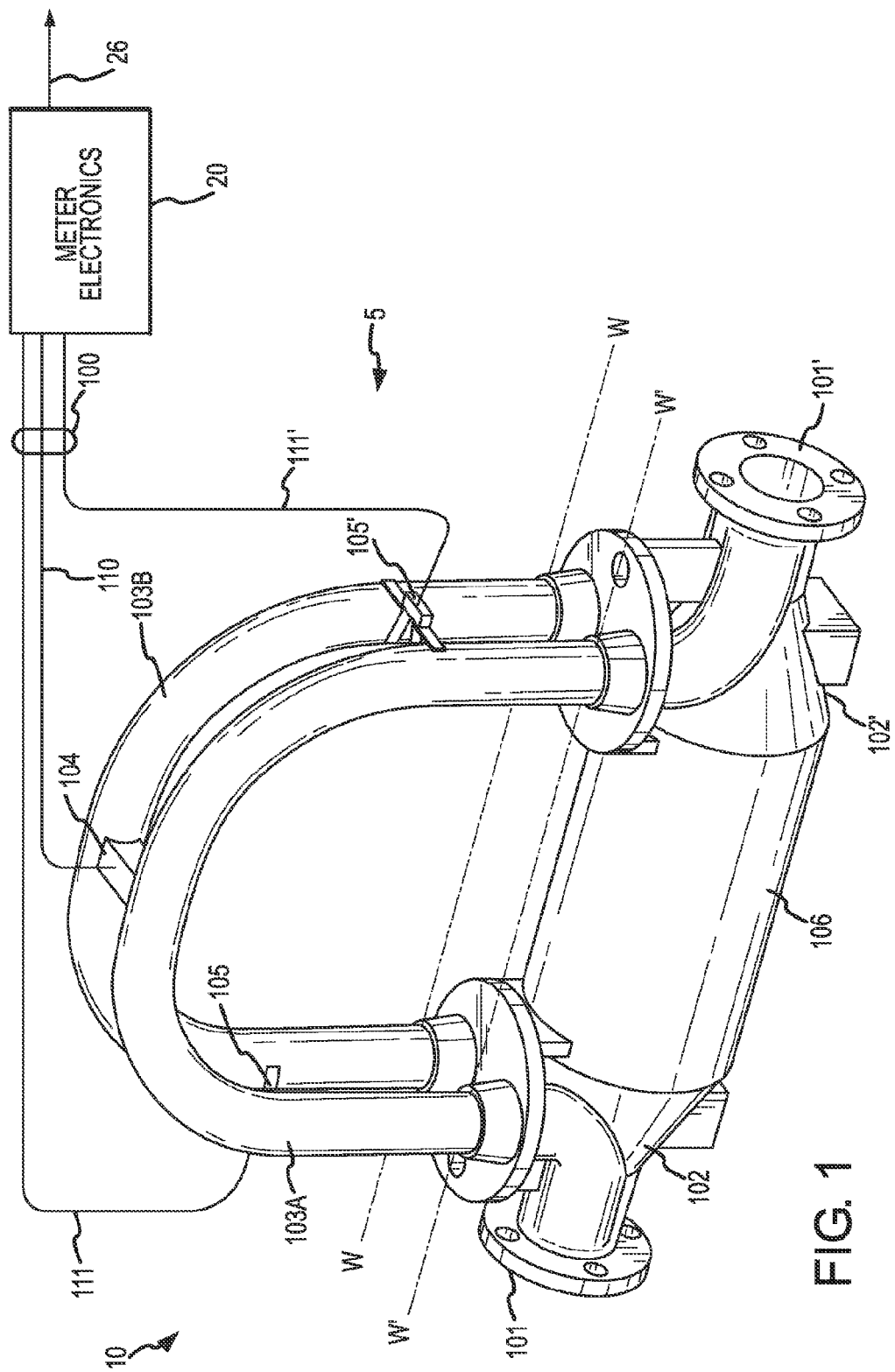
FIG. 1 shows a flow meter comprising a flow meter assembly and meter electronics.

FIG. 1 shows a flow meter 5 comprising a flow meter assembly 10 and meter electronics 20. The meter electronics 20 is connected to the meter assembly 10 via leads 100 and is configured to provide measurements of one or more of a density, mass flow rate, volume flow rate, totalized mass flow, temperature, and other information over a communication path 26. It should be apparent to those skilled in the art that the present invention can be used in any type of Coriolis flow meter regardless of the number of drivers, pick-off sensors, flow conduits, or the operating mode of vibration. In addition, it should be recognized that the flow meter 5 can alternatively comprise a vibratory densitometer.

The flow meter assembly 10 includes a pair of flanges 101 and 101', manifolds 102 and 102', a driver 104, pick-off sensors 105-105', and flow conduits 103A and 103B. The driver 104 and the pick-off sensors 105 and 105' are connected to the flow conduits 103A and 103B.

The flanges 101 and 101' are affixed to the manifolds 102 and 102'. The manifolds 102 and 102' can be affixed to opposite ends of a spacer 106. The spacer 106 maintains the spacing between the manifolds 102 and 102' in order to prevent undesired vibrations in the flow conduits 103A and 103B. When the flow meter assembly 10 is inserted into a conduit system (not shown) which carries the flow material being measured, the flow material enters the flow meter assembly 10 through the flange 101, passes through the inlet manifold 102 where the total amount of flow material is directed to enter the flow conduits 103A and 103B, flows through the flow conduits 103A and 103B and back into the outlet manifold 102', where it exits the meter assembly 10 through the flange 101'.

The flow conduits 103A and 103B are selected and appropriately mounted to the inlet manifold 102 and to the outlet manifold 102' so as to have substantially the same mass distribution, moments of inertia, and elastic modules about the bending axes W--W and W'--W' respectively. The flow conduits 103A and 103B extend outwardly from the manifolds 102 and 102' in an essentially parallel fashion. The flow conduits 103A and 103B are driven by the driver 104 in opposite directions about the respective bending axes W and W' and at what is termed the first out of phase bending mode of the flow meter 5. The driver 104 may comprise one of many well known arrangements, such as a magnet mounted to the flow conduit 103A and an opposing coil mounted to flow conduit 103B. An alternating current is passed through the opposing coil to cause both conduits to oscillate. A suitable drive signal is applied by the meter electronics 20 to the driver 104 via the lead 110.

The meter electronics 20 receives sensor signals on the leads 111 and 111', respectively. The meter electronics 20 produces a drive signal on the lead 110 which causes the driver 104 to oscillate the flow conduits 103A and 103B. The meter electronics 20 processes the left and right velocity signals from the pick-off sensors 105 and 105' in order to compute a mass flow rate. The communication path 26 provides an input and an output means that allows the meter electronics 20 to interface with an operator or with other electronic systems. The description of FIG. 1 is provided merely as an example of the operation of a Coriolis flow meter and is not intended to limit the teaching of the present invention.

Figure 2:
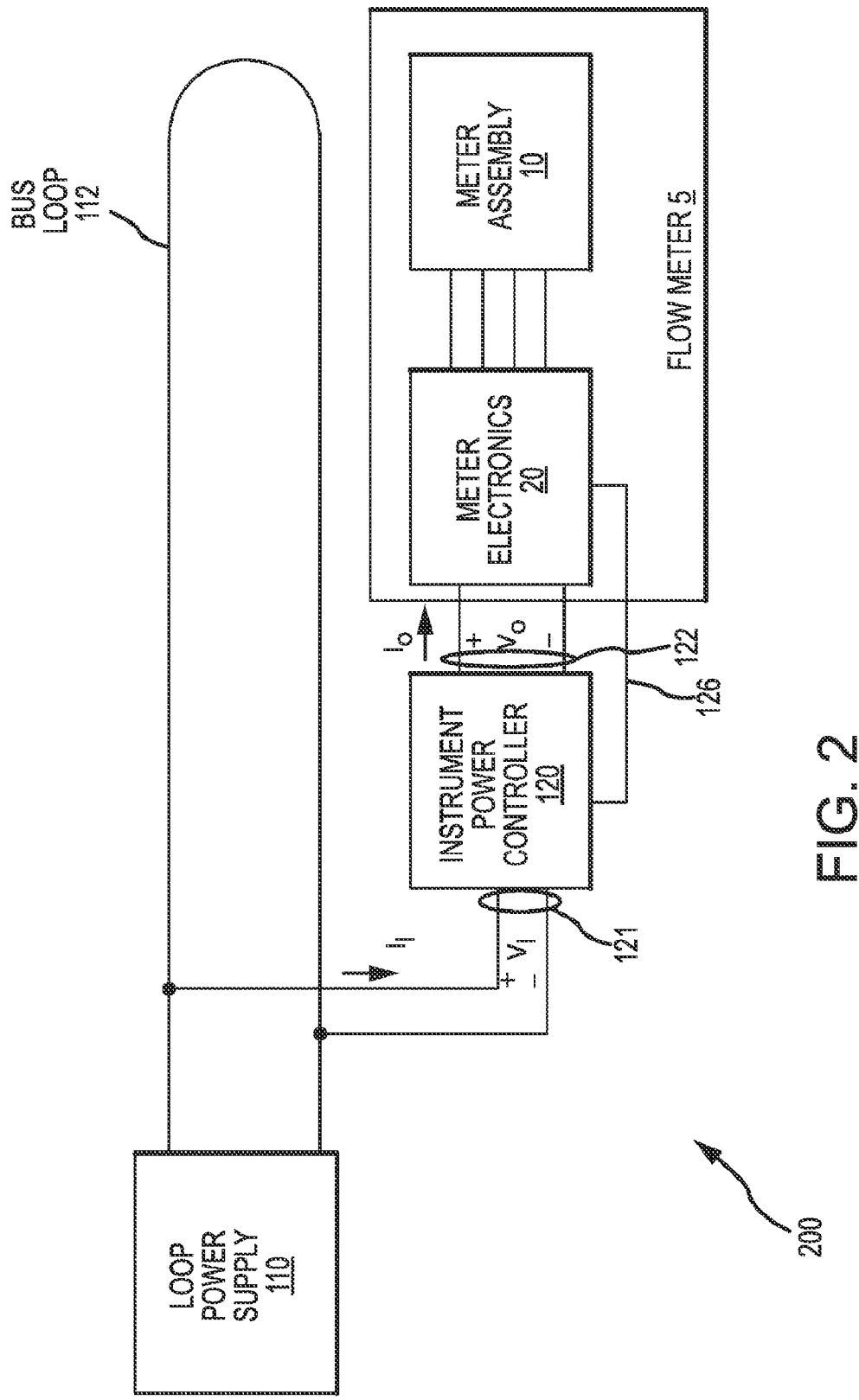
FIG. 2 shows a bus system according to an embodiment of the invention.

FIG. 2 shows a bus system 200 according to an embodiment of the invention. The bus system 200 includes a loop power supply 110 connected to a bus loop 112. The flowmeter environment 100 can further include an instrument power controller 120 coupled to the bus loop 112. In some embodiments, the instrument power controller 120 adaptively provides an output voltage $V_O$ and an output current $I_O$ that together maintain a substantially constant electrical output power $P_O$. The output power PO can be provided to a variable impedance load L, such as the vibratory flow meter 5 or other bus instrument 5.

The loop power supply 110 can have a fixed or limited voltage output and a fixed or limited current output. In an IS power supply, the provided electrical power (including specifically the provided electrical current) is limited in order to prevent combustion or explosion when used in a hazardous environment. In some embodiments, the loop power supply 110 comprises an Intrinsically Safe (IS) power supply. Therefore, the loop power supply 110 can comply with a specific safety standard.

Various devices connected to the bus loop 112 can send data to and otherwise communicate with the loop power supply 110. Where the loop power supply 110 is behind an IS barrier, for example, the loop power supply 110 can relay the data and communications on to other devices, including monitoring and/or recording equipment, a transmitter for communicating with other devices, an operator display, etc.

The bus loop 112 can receive one or more bus instruments 5 and can provide electrical power to the one or more bus instruments 5. The bus loop 112 can transfer communications between the loop power supply 110 and the one or more bus instruments 5. The bus loop 112 can include multi-device buses (such as Foundation fieldbus, for example), as well as single device loops (such as a 4-20 mA bus, for example).

The instrument power controller 120 includes inputs 121 and outputs 122. The instrument power controller 120 receives electrical power at the inputs 121 from the loop power supply 110 via the bus loop 112. The instrument power controller 120 provides electrical power to the one or more connected bus instruments 5 at the outputs 122 and additionally can transfer communications between a connected bus instrument 5 and the loop power supply 110. The instrument power controller 120 provides a substantially constant electrical power to the one or more connected bus instruments 5.

In the embodiment shown, the connected bus instrument 5 comprises a vibratory flow meter that is coupled to the instrument power controller 120. The bus instrument 5 can include a meter assembly 10 and meter electronics 20, as previously discussed. However, it should be understood that other bus instruments 5 can be connected to the instrument power controller 120.

The instrument power controller 120 includes a communication path 126. The instrument power controller 120 exchanges communications with the loop power supply 110 over the bus loop 112. In addition, the communication path 126 exchanges communications between the bus instrument 5 and the instrument power controller 120. The instrument power controller 120 can therefore relay communications between the loop power supply 110 and the bus instrument 5. In addition, the instrument power controller 120 can translate/convert the communications. For example, if the meter electronics 20 generates digital communication signals, the instrument power controller 120 can convert the digital measurement signals into analog current levels that are appropriate to the loop current $I_L$.

Communication over the bus loop 112 according to some protocols entails varying the loop electrical current $I_L$ flowing through the bus loop 112. According to at least one instrumentation bus protocol, the loop current $I_L$ is varied between 4 milliamps (mA) and 20 mA when the bus instrument 5 is operating and therefore constitutes an analog measurement signal. The meter electronics 20 will control the loop current $I_L$ by signals sent to the instrument power controller 120 and according to a measured mass flow rate of a flow material through the meter assembly 10. When there is no flow through the meter assembly 10, or where the bus instrument 5 is not in an operational mode, the loop current $I_L$ can be held to less than 4 mA, according to a relevant instrumentation bus protocol.

However, an IS compliant bus protocol limits the total power that can be delivered to the bus instrument 5, such as a flow meter 5, for example. The bus instrument 5 cannot receive more power (P) than is available over the bus loop 112. Electrical power (P) is defined as voltage (V) multiplied by current (I), or:

$$P=V*I \qquad (1)$$

Vibratory flow meters, such as Coriolis flow meters and vibratory densitometers, oscillate by the application of electrical current to a drive coil mounted to one tube, creating a magnetic field that drives a magnet on the opposite tube. The force (F) between the coil and magnet is proportional to magnetic field strength of the magnet (B), the current (i) in the coil, and the length (L) of the coil, as expressed in the equation:

$$F=BiL \qquad (2)$$

As tube amplitude increases, a voltage (i.e., EMF) is developed in the coil. The voltage is proportional to the amplitude of flow tube vibration. In order to maintain a particular drive amplitude, the drive voltage must be at least as large as the coil EMF voltage associated with that amplitude. However, in practice the drive voltage must be larger than the coil EMF to overcome the voltage drop due to series resistance of the coil.

The average power consumed by the meter assembly 10 is the product of the coil drive current multiplied by the coil drive EMF. Coriolis flow meters have typically been designed to produce drive coil EMF voltages in the range of 2V to 5V and to consume a drive current of 1 to 10 mA at the target vibrational amplitude. In contrast, a typical transmitter for a flow meter has been designed to supply 10V at up to 100 mA to the driver 104. The excess drive voltage allows for the maximum sensor EMF voltage plus overhead to accommodate series resistance. The excess drive current provides additional energy to the system when adverse process flow conditions consume additional drive power, such as during the occurrence of entrained air, for example. The excess drive current also serves to overcome the inertia of the meter assembly 10 at startup, allowing the target amplitude to be achieved relatively rapidly, perhaps within one to two seconds, for example.

The limited voltage and current available in an IS bus environment presents several problems for a vibratory flow meter. The power limitations inherent in a bus device powered from a loop constrains the maximum drive current, reducing the capability to maintain the target vibrational amplitude under adverse flow conditions. As a result, the vibration of the flowtubes may not be able to be satisfactorily maintained during adverse flow conditions. For example, where there is entrained air present in the flow material, the flowtubes will naturally vibrate at a higher frequency. The entrained air can comprise bubbles, stratified flow, or slug flow, for example. During slug flow, the vibrational frequency may need to fluctuate rapidly.

Another significant problem in an IS bus environment is the provision of electrical power to the meter assembly 10 during startup. Vibration of the meter assembly 10 from rest to a substantially resonant frequency takes time and electrical current to accomplish. The startup time for vibration of the flow conduit or conduits is increased in duration as current capability is decreased. The constrained drive current unavoidably lengthens the time required to achieve the target amplitude at startup, which in a standard topology can be as long as four minutes, depending on flowtube size and other factors. Therefore, a startup time for a flow meter assembly can be greatly increased where electrical current is limited due to IS considerations. A greatly lengthened meter startup time is undesirable or even unacceptable to most flow meter customers.

During the flow meter startup, the output voltage $V_O$ can be kept just slightly above a response voltage level from the load (i.e., the bus instrument 5). Accordingly, the output current $I_O$ can be a maximum at the beginning of the flow meter startup, as a lower output voltage $V_O$ enables a higher output current $I_O$ to be produced by the instrument power controller 120. As the vibrational amplitude of the meter assembly 10 increases, the output voltage $V_O$ can be increased and the output current $I_O$ can be decreased.

In the prior art, these drawbacks have led to the applied power at the driver being much less than the available power. The typical prior art approach is to simply limit the output current $I_O$ to the bus instrument 5 while not limiting the output voltage $V_O$. However, the output voltage $V_O$ may be much higher than is necessary, especially where the meter assembly 10 is below the target vibrational amplitude. Consequently, the applied power is much less than the available power, especially during periods of high current requirements.

The instrument power controller 120 according to the invention provides a substantially constant output power $P_O$ to the connected bus instrument 5. The instrument power controller 120 varies both the supplied voltage and the supplied current. In some embodiments, the instrument power controller 120 increases the output current $I_O$ by reducing the output voltage $V_O$. The instrument power controller 120 therefore optimizes the electrical output power $P_O$ that is supplied to the connected bus instrument 5. The instrument power controller 120 can keep the output voltage $V_O$ just slightly higher that the vibrational response amplitude, for example. The lower output voltage $V_O$ enables the instrument power controller 120 to provide a higher output current $I_O$. Consequently, while maintaining a substantially constant output power $P_O$, the instrument power controller 120 can reduce the flow meter startup time and can increase the ability of the flow meter to adapt to changing flow conditions, including multi-phase flow conditions.

In some embodiments, the output voltage $V_O$ and the output current $I_O$ can be varied between fixed, discrete levels. Alternatively, the output voltage $V_O$ and the output current $I_O$ can be continuously varied.

The instrument power controller 120 is depicted as a separate component. However, it should be understood that the instrument power controller 120 can alternatively comprise a component or portion of the connected bus instrument 5, such as an integral portion of the meter electronics 20, for example.

Figure 3:
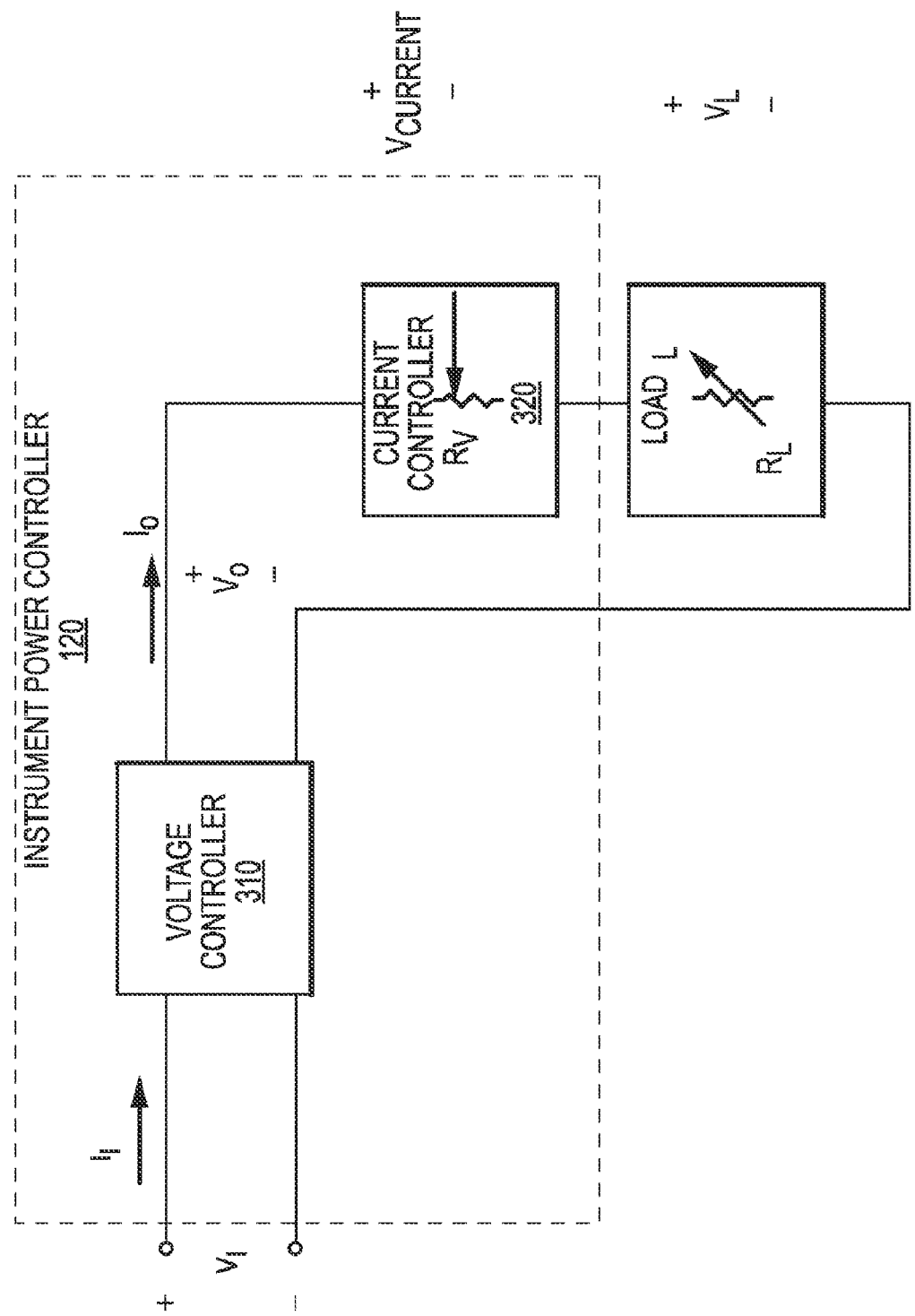
FIG. 3 shows an instrument power controller according to an embodiment of the invention.

FIG. 3 shows the instrument power controller 120 according to an embodiment of the invention. In some embodiments, the instrument power controller 120 adaptively provides an output voltage $V_O$ and an output current $I_O$ that together maintain a substantially constant electrical output power $P_O$. The output power PO can be provided to a variable impedance load L, such as the vibratory flow meter 5 or other bus instrument 5.

In the embodiment shown, the instrument power controller 120 comprises a voltage controller 310 and a current controller 320. The voltage controller 310 can vary the output voltage $V_O$. The current controller 320 can vary the output current $I_O$. The communication line 126 (not shown) can be coupled to one or both of the voltage controller 310 and the current controller 320. The communication line 126 can communicate a response voltage level to the voltage controller 310 and the current controller 320. In addition, the communication line 126 can communicate other information to the voltage controller 310 and the current controller 320.

The voltage controller 310 and the current controller 320 both are connected to the communication line 126. Consequently, the voltage controller 310 and the current controller 320 can vary the output voltage $V_O$ and the output current $I_O$, as required. Alternatively, the instrument power controller 120 of this embodiment can include a processing device or control (not shown) that controls the voltage controller 310 and the current controller 320 to vary the output voltage $V_O$ and the output current $I_O$.

The voltage controller 310 can output a varied output voltage $V_O$, as needed. The output voltage $V_O$ can be less than or greater than the input voltage $V_I$. Consequently, in some embodiments the voltage controller 310 comprises a DC-DC converter that can increase the output voltage $V_O$ to be greater than the input voltage $V_I$. The DC-DC converter is also variously referred to as a voltage or charge pump, a buck converter, etc.

The current controller 320 can regulate and output a varied output current $I_O$, as needed. The current controller 320 in some embodiments can comprise a variable resistance $R_V$. The current controller 320 will generate a voltage drop $V_{current}$. The load L can comprise any manner of variable impedance device. For example, the load L can comprise a flow meter 5, including a vibratory flow meter 5. For example, the load L can comprise a Coriolis flow meter 5 or a vibratory densitometer 5. The load L will generate a load voltage $V_L$. The output voltage $V_O$ comprises the current control voltage $V_{current}$ plus the load voltage $V_L$. Similarly, the output power $P_O$ comprises the load power $P_L$ plus a current control power $P_{CC}$.

Figure 4:
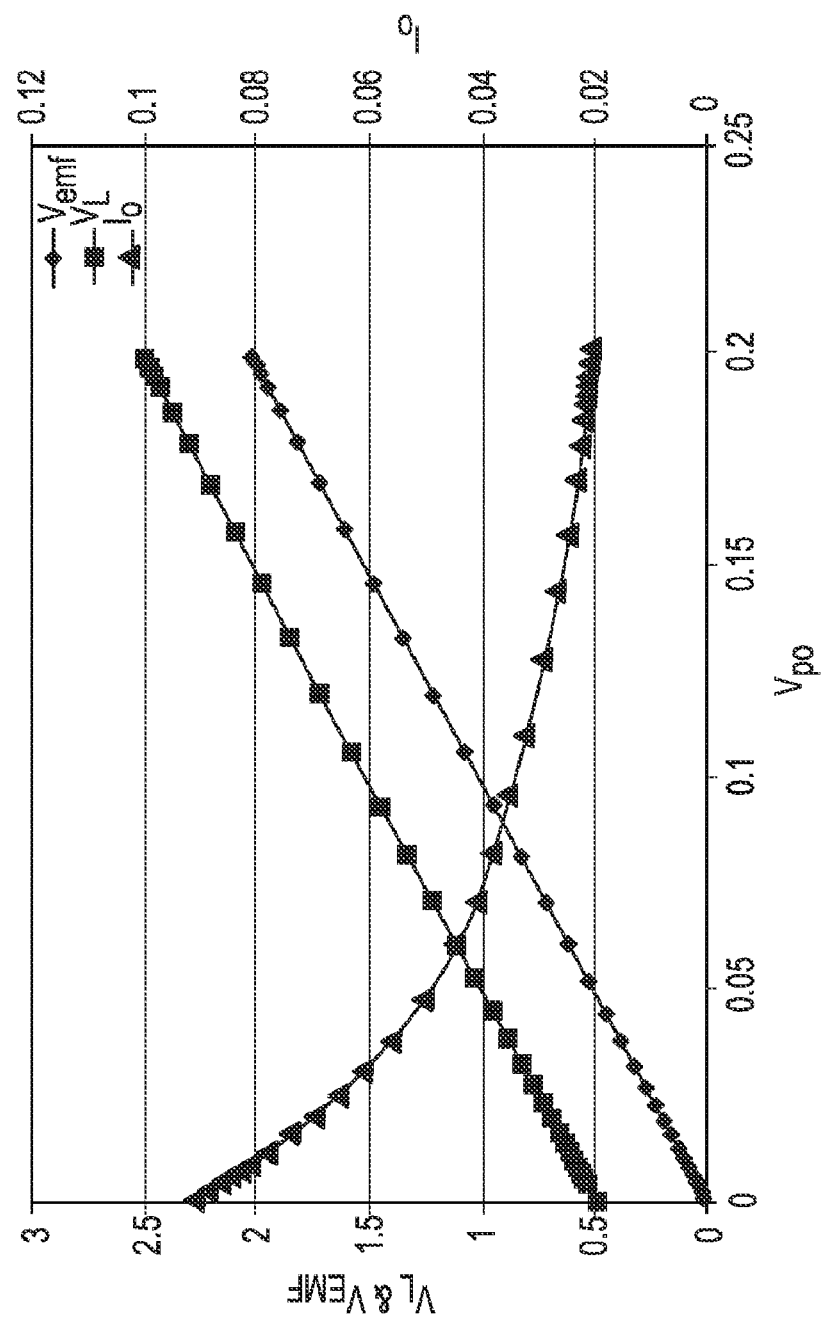
FIG. 4 is a graph of an absolute value of voltage of a driver coil $V_{emf}$, a load voltage $V_L$ (where $V_L$ comprises $V_{emf}$ plus a voltage due to a resistance RL of the load/driver), and an output current $I_O$.

FIG. 4 is a graph of an absolute value of voltage of the driver coil $V_{emf}$, the load voltage $V_L$ (where $V_L$ comprises $V_{emf}$ plus a voltage due to a resistance $R_L$ of the load/driver), and the output current $I_O$. The load voltage $V_L$ can be obtained as a pickoff voltage $V_{PO}$ where the load L comprises a vibratory flow meter 5. The graph illustrates the changing nature of a vibratory flow meter as a load during startup of vibration of the flow meter assembly 10.

The impedance of the load L, where the load L comprises a vibratory flow meter 5, will be minimal as the flow meter 5 is started up (i.e., where the flow meter assembly 10 is not vibrating or is vibrating at a relatively small amplitude). Conversely, as the flow meter assembly 10 nears or reaches a target vibrational amplitude, the impedance increases and consequently the current needed to maintain the vibration will decrease. Therefore, larger electrical current levels will be needed at startup of the flow meter 5 or when adverse flow conditions occur. For example, in cases of high levels of entrained air or slug flow, the vibration of the flow meter assembly 10 will be heavily damped and the vibrational amplitude may drop precipitously. As a result, during normal operation there may occur time periods when the current demand greatly increases and the output current may need to be correspondingly increased in order to resume or maintain proper vibrational levels.

Conversely, a voltage needed to startup vibration or resume proper vibrational levels in the flow meter assembly 10 are relatively low. The output voltage requirement will increase as the flow meter assembly 10 nears a target vibrational amplitude and as the driver coil requires larger voltage levels in order to change direction but yet maintain a drive frequency.

Figure 5:
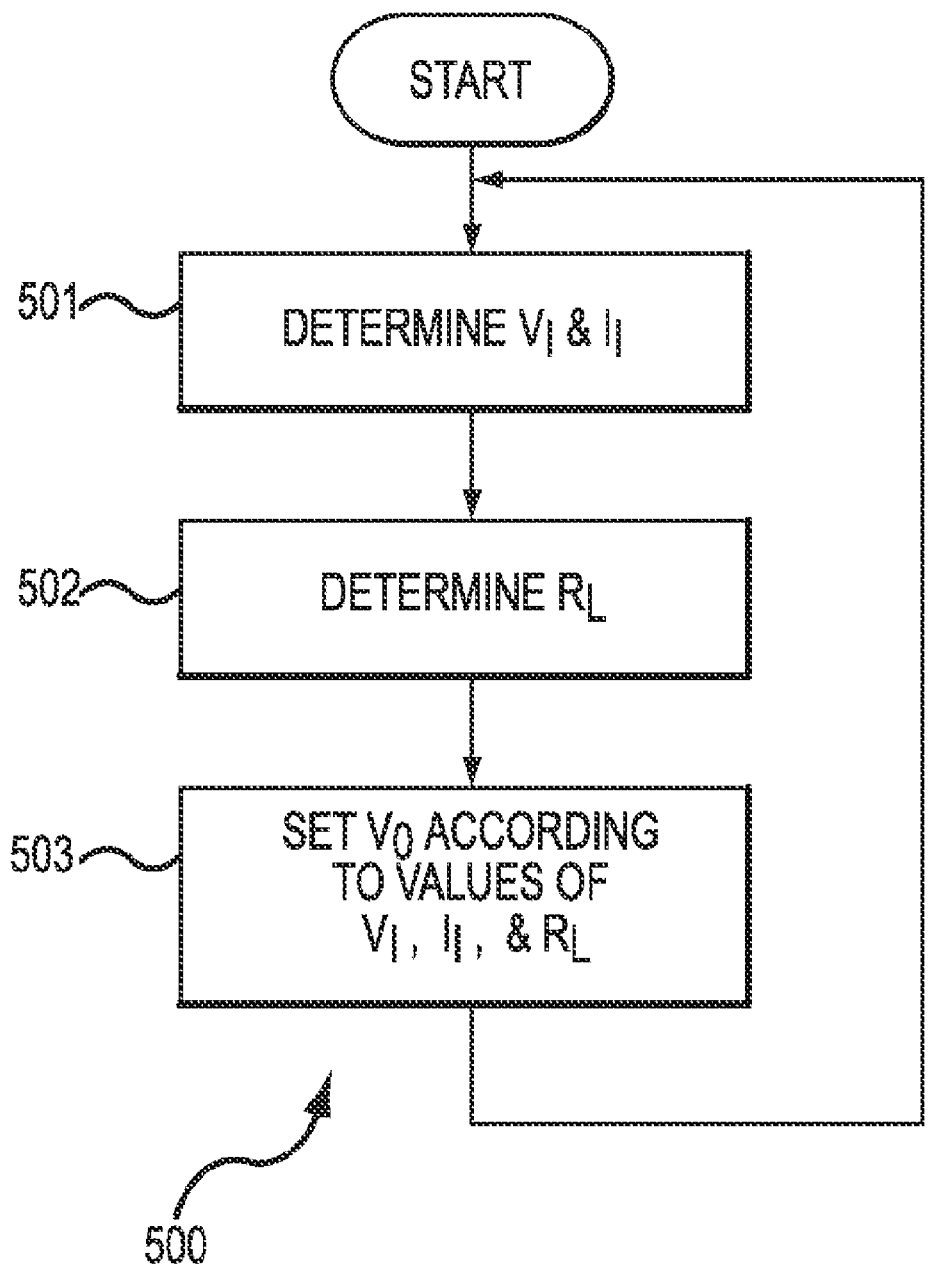
FIG. 5 is a flowchart of a method for adaptively providing an output voltage $V_O$ and an output current $I_O$ that together maintain a substantially constant electrical output power $P_O$ according to an embodiment of the invention.

FIG. 5 is a flowchart 500 of a method for adaptively providing an output voltage $V_O$ and an output current $I_O$ that together maintain a substantially constant electrical output power $P_O$ according to an embodiment of the invention. In step 501, the input voltage $V_I$ and the input current $I_I$ are determined. The input voltage $V_I$ and the input current $I_I$ can be obtained from the bus loop 112, for example. The input voltage $V_I$ and the input current $I_I$ comprise an available input power $P_I$.

In some embodiments, the bus loop 112 comprises an Intrinsically Safe (IS) bus loop. Consequently, the input power $P_I$ available from the bus loop 112 is typically limited and an output current $I_O$ cannot necessarily be increased as needed, at least not without decreasing the output voltage $V_O$.

In step 502, an effective resistance $R_L$ of a variable impedance load L is determined. The $C_1$ term comprises a conversion factor and the load voltage $V_L$ in some embodiments comprises a pickoff voltage of a pickoff sensor of the vibratory flow meter. In some embodiments, the effective resistance $R_L$ comprises:

$$R_L = C_1 V_L \quad (3)$$

The effective resistance $R_L$ can vary over time. As previously discussed, where the load L comprises a vibratory flow meter, for example, the impedance can vary according to the vibration of the flow meter assembly. The vibration can vary during startup and can also vary during adverse or abnormal flow conditions such as gas in a liquid flow (including in the form of bubbles, stratified flow, slug flow, etc.) or other multiphase flows, changes in density of the flow material, etc. The determined effective resistance $R_L$ can therefore comprise a substantially instantaneous impedance or can comprise an at least partially averaged impedance.

In step 503, the output voltage $V_O$ and the output current $I_O$ are set. Assuming one hundred percent efficiency, i.e., no loss in the instrument power controller 120, then the output power $P_O$ will be equal to the input power $P_I$, where power $P = V*I$. As a result, the output voltage $V_O$ can be determined according to the formula:

$$V_O = \sqrt{V_I I_I R_L} \quad (4)$$

It should be understood that the output power $P_O$ will not be truly equal to the input power $P_I$, as some electrical power will be consumed by the instrument power controller.

In some embodiments, the output voltage $V_O$ comprises:

$$V_O = C_2 \sqrt{V_I I_I R_L} \quad (5)$$

Here, the $C_2$ term comprises a non-ideal power loss factor or efficiency multiplier (i.e., $V_O < V_I$). Equations 4 and 5 therefore enable the output voltage $V_O$ to be set according to the operating conditions of the load L. Equations 4 and 5 further enable the output power to be maintained at a substantially constant level, even as the effective resistance $R_L$ varies over time. Consequently, the output voltage $V_O$ can be reduced while increasing the output current $I_O$, and vice versa. For example, if the effective resistance $R_L$ drops during operation of the vibratory flow meter, the output voltage $V_O$ can be correspondingly reduced so that the output current $I_O$ can be increased. Conversely, if the effective resistance $R_L$ increases, the output current $I_O$ can be correspondingly reduced so that the output voltage $V_O$ can be increased.

Subsequently, the method loops back to step 501 and iteratively controls the output voltage $V_O$ and the output current $I_O$.

Figure 6:
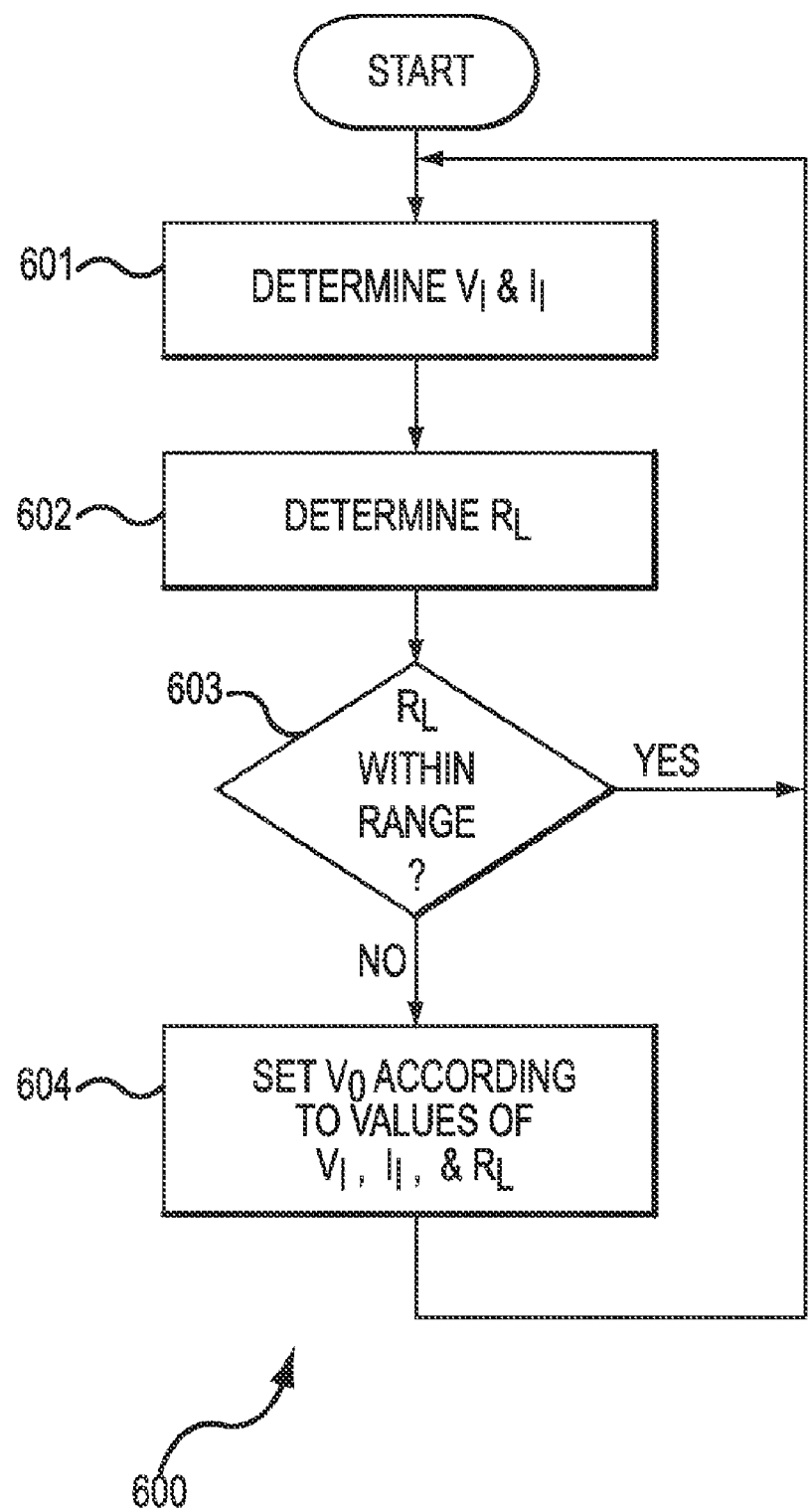
FIG. 6 is a flowchart of a method for adaptively providing an output voltage $V_O$ and an output current $I_O$ that together maintain a substantially constant electrical output power $P_O$ according to an embodiment of the invention.

FIG. 6 is a flowchart 600 of a method for adaptively providing an output voltage $V_O$ and an output current $I_O$ that together maintain a substantially constant electrical output power $P_O$ according to an embodiment of the invention. In step 601, the input voltage $V_I$ and the input current $I_I$ are determined, as previously discussed.

In step 602, an effective resistance $R_L$ is determined, as previously discussed.

In step 603, if the effective resistance $R_L$ is within a predetermined normal operating range, then the method loops back on itself, otherwise the method proceeds to step 604. The predetermined normal operating range corresponds to an optimal or expected vibration of the flow meter assembly 10 and an optimal or expected vibrational amplitude. The predetermined normal operating range can vary according to a flow meter model and according to a flow material. If the effective resistance $R_L$ is within the predetermined normal operating range, then the load L can be considered to be operating satisfactorily and no further action is taken in this iteration of the control loop. Otherwise, if the effective resistance $R_L$ is not within the predetermined normal operating range, then the output voltage $V_O$ must be set (i.e., changed). The comparison will typically fail during startup or during some manner of flow anomaly, such as entrained gas in the flow material, for example.

In step 604, the output voltage $V_O$ and the output current $I_O$ are set if the effective resistance $R_L$ is not within the predetermined normal operating range, as previously discussed.

Figure 7:
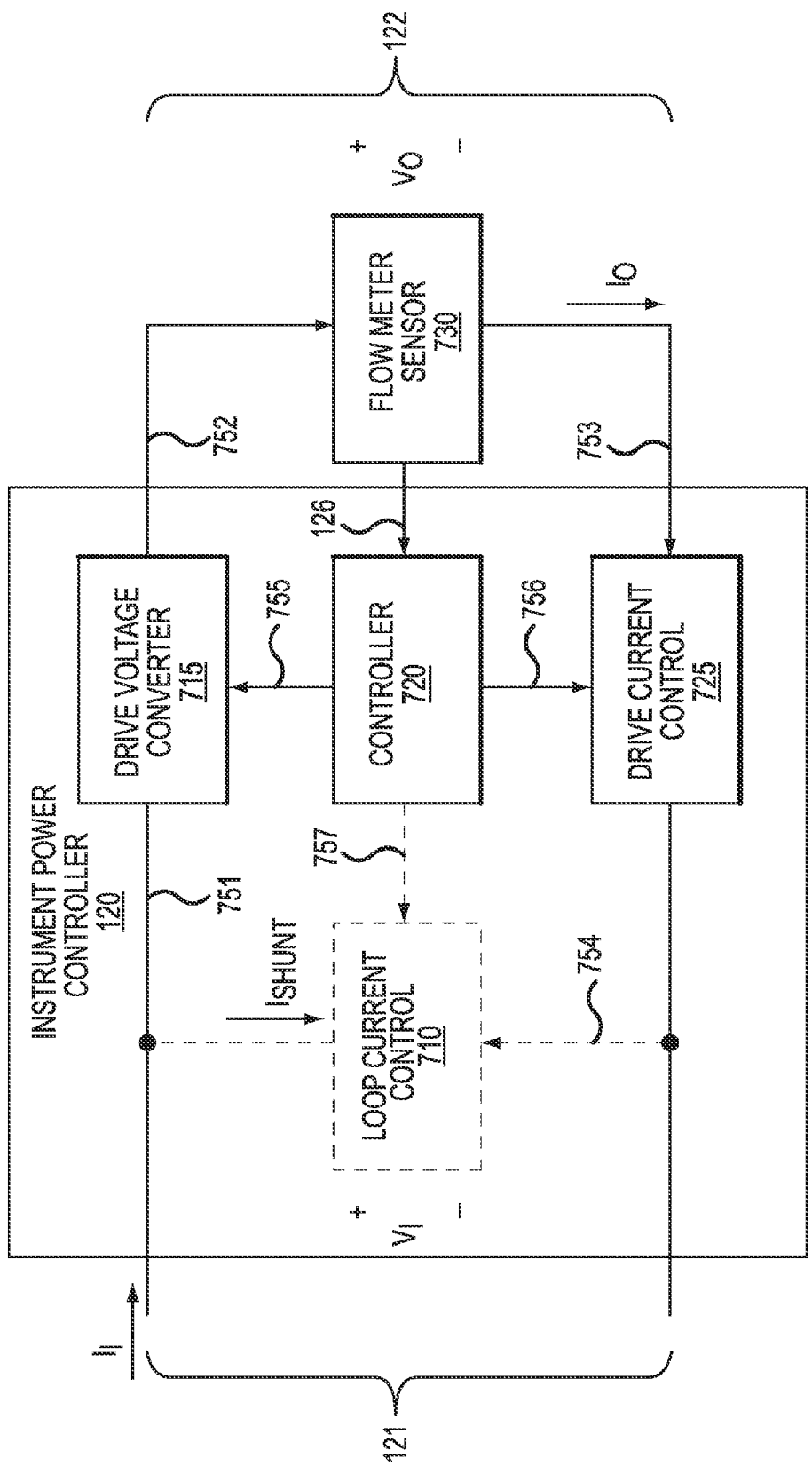
FIG. 7 shows the instrument power controller according to an embodiment of the invention.

FIG. 7 shows the instrument power controller 120 according to an embodiment of the invention. In this embodiment, the instrument power controller 120 includes a loop current control 710, a drive voltage converter 715, a controller 720, and a drive current control 725. The loop current control 710 can comprise an optional component (see dashed lines) and may be included in embodiments where the input current $I_I$ is modulated in order to communicate data over the inputs 121. The drive voltage converter 715 is coupled to the controller 720 by a line 755 and is coupled to the loop current control 710 by a line 751. The loop current control 710 is coupled to the controller 720 by a line 757, is coupled to the drive current control 725 by a line 754, and is coupled to the drive voltage converter 715 by the line 751. The drive current control 725 is coupled to the controller 720 by a line 756. The lines 751 and 754 further comprise the inputs 121.

The instrument power controller 120 in this embodiment is connected to a flow meter sensor 730. The flow meter sensor 730 can include the meter assembly 10. In addition, the flow meter sensor 730 can include the meter electronics 20. The flow meter sensor 730 is coupled to the drive voltage converter 715 by a line 752, is coupled to the drive current control 725 by a line 753, and is coupled to the controller 720 by the communication path 126. The lines 752 and 753 further comprise the outputs 122. The flow meter sensor 730 receives electrical power through lines 752 and 753. One or more measurement signals (an optionally other sensor characteristics) are provided to the controller 720 via the communication path 126. For example, a mass flow rate and/or density can be provided to the controller 720 over the communication path 126.

The drive voltage converter 715 can receive the input voltage $V_I$ and can generate an output voltage $V_O$ that is independent of the input voltage $V_I$. The output voltage $V_O$ can be less than, equal to, or greater than the input voltage $V_I$. The drive voltage converter 715 can create an output voltage $V_O$ that is greater than the input voltage $V_I$ provided by the bus loop 112 or other power input. The drive voltage converter 715 can comprise a DC-DC converter, for example. The drive voltage converter 715 can convert the DC input voltage $V_I$ to an AC waveform, can step up the voltage of the AC waveform, and can then convert the AC waveform back to a DC voltage. In this manner, the output voltage $V_O$ can be generated to be greater than the input voltage $V_I$.

In operation, the drive voltage converter 715 can provide a predetermined output voltage $V_O$ to the flow meter sensor 730. In addition, the drive voltage converter 715 can vary the output voltage $V_O$ over a predefined voltage range, such as an IS specific voltage range, for example. The output voltage $V_O$ can be varied in order to maximize the output current $I_O$ while maintaining the substantially constant output power $P_O$, as previously discussed.

The loop current control 710 can regulate the amount of input current $I_I$ that is provided to the flow meter sensor 730. Consequently, the loop current control 710 can convert at least part of the input current $I_I$ into the output current $I_O$. The output current $I_O$ can be less than or equal to the input current $I_I$. In some embodiments, the output current $I_O$ can even be greater than the input current $I_I$. However, in other embodiments, unlike the output voltage $V_O$, the output current $I_O$ cannot exceed the input current $I_I$.

The controller 720 receives feedback information from the flow meter sensor 730 via the communication path 126. The feedback information can include the load voltage $V_L$, as previously discussed. In addition, the controller 720 can receive other information, including a response frequency, a phase lag or time delay between pickoff sensor signals, etc. The load voltage $V_L$ is related to an amplitude of a vibrational response in the flow meter sensor 730. The load voltage $V_L$ can comprise a pickoff voltage in some embodiments. The controller 720 is coupled to the drive voltage convert 715 and to the loop current control 710 and is configured to vary the output voltage $V_O$ and the output current $I_O$.

The controller 720 can be configured to control the drive voltage converter 715 and the loop current control 710 in order to generate a substantially constant output power $P_O$ to the flow meter sensor 730 while varying both the output voltage $V_O$ and the output current $I_O$ in relation to the load voltage $V_L$ received from the flow meter sensor 730. Alternatively, the controller 720 can be configured to control the drive voltage converter 715 and the loop current control 710 in order to increase the output current $I_O$ and correspondingly decrease the output voltage $V_O$ in order to maintain a substantially constant output power $P_O$ if the load voltage $V_L$ is below a predetermined operational threshold (i.e., if the effective impedance $R_L$ is not within a predetermined normal operating range).

What is claimed is:

1. An instrument power controller (120) for adaptively providing an output voltage $V_O$ and an output current $I_O$ that together maintain a substantially constant electrical output power $P_O$, the instrument power controller (120) comprising inputs (121) for receiving an input power $P_I$, outputs (122) for providing the substantially constant output power $P_O$ to a variable impedance load L, and a communication path (126) for receiving a load voltage $V_L$ from the load L, with the instrument power controller (120) being characterized by:

the instrument power controller (120) being configured to determine an input voltage $V_I$ and an input current $I_I$ determine an effective resistance $R_L$, of the load L and set the output voltage $V_O$ and the output current $I_O$ based on the input voltage $V_I$, the input current $I_I$, and the effective resistance $R_L$, with the output voltage $V_O$ being substantially independent from the input voltage $V_I$ and with the output voltage $V_O$ and the output current $I_O$ being varied so as to maximize a load power $P_L$ being transferred to the variable impedance load L while maintaining the substantially constant electrical output power $P_O$.

2. The controller (120) of claim 1, with the input voltage $V_I$ comprising a substantially fixed input voltage $V_I$.

3. The controller (120) of claim 1, with the effective resistance $R_L$ comprising $R_L = C_1 V_L$.

4. The controller (120) of claim 1, with the output voltage $V_O$ comprising $V_O = C_2 \sqrt{V_I I_I R_L}$.

5. The controller (120) of claim 1, with the input voltage $V_I$ and the input current $I_I$ complying with a bus loop standard.

6. The controller (120) of claim 1, with the input voltage $V_I$ and the input current $I_I$ complying with an intrinsically safe (IS) standard.

7. The controller (120) of claim 1, with the load L comprising a vibratory flow meter (5) and with the load voltage $V_L$ being related to a vibrational amplitude of one or more flow conduits (103) of the vibratory flow meter (5).

8. The controller (120) of claim 1, with the load L comprising a Coriolis flow meter (5) and with the load voltage $V_L$ being related to a vibrational amplitude of one or more flow conduits (103) of the Coriolis flow meter (5).

9. The controller (120) of claim 1, with the load L comprising a vibratory densitometer (5) and with the load voltage $V_L$ being related to a vibrational amplitude of one or more flow conduits (103) of the vibratory densitometer (5).

10. The controller (120) of claim 1, with the instrument power controller (120) being further configured to determine whether the effective resistance $R_L$ is within a predetermined normal operating range and set the output voltage $V_O$ and the output current $I_O$ based on the input voltage $V_I$, the input current $I_I$, and the effective resistance $R_L$ if the effective resistance $R_L$ is not within the predetermined normal operating range.

11. The controller (120) of claim 1, with the instrument power controller (120) further comprising:
    a voltage supply (510) configured to set the output voltage $V_O$; and
    a current supply (520) configured to set the output current $I_O$.

12. The controller (120) of claim 1, with the instrument power controller (120) further comprising:
    a drive voltage converter (615) configured to set the output voltage $V_O$;
    a drive current source (625) configured to provide the output current $I_O$; and
    a control (620) coupled to the drive voltage converter (615), to the load L, and to the loop current control (610), with the control (620) configured to control the drive voltage converter (615) and the drive current source (625) to generate the substantially constant output power $P_O$ while setting both the output voltage $V_O$ and the output current $I_O$.

13. An electrical power control method for adaptively providing an output voltage $V_O$ and an output current $I_O$ that together maintain a substantially constant electrical output power $P_O$, the method comprising determining an input voltage $V_I$ and an input current $I_I$, with the method being characterized by:
    determining an effective resistance $R_L$ of a variable impedance load L; and
    setting the output voltage $V_O$ and the output current $I_O$ based on the input voltage $V_I$, the input current $I_I$, and the effective resistance $R_L$, with the output voltage $V_O$ being substantially independent from the input voltage $V_I$ and with the output voltage $V_O$ and the output current $I_O$ being varied so as to maximize a load power $P_L$ being transferred to the variable impedance load L while maintaining the substantially constant electrical output power $P_O$.

14. The method of claim 13, with the input voltage $V_I$ comprising a substantially fixed input voltage $V_I$.

15. The method of claim 13, with the effective resistance $R_L$ comprising $R_L = C_1 V_L$.

16. The method of claim 13, with the output voltage $V_O$ comprising $V_O = C_2 \sqrt{V_I I_I R_L}$.

17. The method of claim 13, with the input voltage $V_I$ and the input current $I_I$ complying with a bus loop standard.

18. The method of claim 13, with the input voltage $V_I$ and the input current $I_I$ complying with an intrinsically safe (IS) standard.

19. The method of claim 13, with the load L comprising a vibratory flow meter and with the load voltage $V_L$ being related to a vibrational amplitude of one or more flow conduits of the vibratory flow meter.

20. The method of claim 13, with the load L comprising a Coriolis flow meter and with the load voltage $V_L$ being related to a vibrational amplitude of one or more flow conduits of the Coriolis flow meter.

21. The method of claim 13, with the load L comprising a vibratory densitometer and with the load voltage $V_L$ being related to a vibrational amplitude of one or more flow conduits of the vibratory densitometer.

22. The method of claim 13, further comprising:
    determining whether the effective resistance $R_L$ is within a predetermined normal operating range; and
    setting the output voltage $V_O$ and the output current $I_O$ based on the input voltage $V_I$, the input current $I_I$, and the effective resistance $R_L$ if the effective resistance $R_L$ is not within the predetermined normal operating range.

23. An electrical power control method for adaptively providing an output voltage $V_O$ and an output current $I_O$ that together maintain a substantially constant electrical output power $P_O$, the method comprising determining an input voltage $V_I$ and an input current $I_I$, with the method being characterized by:
    determining an effective resistance $R_L$ of a variable impedance load L;
    determining whether the effective resistance $R_L$ is within a predetermined normal operating range; and
    setting the output voltage $V_O$ and the output current $I_O$ based on the input voltage $V_I$, the input current $I_I$, and the effective resistance $R_L$ if the effective resistance $R_L$ is not within the predetermined normal operating range, with the output voltage $V_O$ being substantially independent from the input voltage $V_I$ and with the output voltage $V_O$ and the output current $I_O$ being varied so as to maximize a load power $P_L$ being transferred to the variable impedance load L while maintaining the substantially constant electrical output power $P_O$.

24. The method of claim 23, with the input voltage $V_I$ comprising a substantially fixed input voltage $V_I$.

25. The method of claim 23, with the effective resistance $R_L$ comprising $R_L = C_1 V_L$.

26. The method of claim 23, with the output voltage $V_O$ comprising $V_O = C_2 \sqrt{V_I I_I R_L}$.

27. The method of claim 23, with the input voltage $V_I$ and the input current $I_I$ complying with a bus loop standard.

28. The method of claim 23, with the input voltage $V_I$ and the input current $I_I$ complying with an intrinsically safe (IS) standard.

29. The method of claim 23, with the load L comprising a vibratory flow meter and with the load voltage $V_L$ being related to a vibrational amplitude of one or more flow conduits of the vibratory flow meter.

30. The method of claim 23, with the load L comprising a Coriolis flow meter and with the load voltage $V_L$ being related to a vibrational amplitude of one or more flow conduits of the Coriolis flow meter.

31. The method of claim 23, with the load L comprising a vibratory densitometer and with the load voltage $V_L$ being related to a vibrational amplitude of one or more flow conduits of the vibratory densitometer.

* * * * *